(12) United States Patent
Mazur et al.

(10) Patent No.: US 12,729,986 B2
(45) Date of Patent: Sep. 8, 2026

(54) LONG RANGE DISTRIBUTED FIBER SENSING WITH IMPROVED NOISE PERFORMANCE

(71) Applicant: Nokia Solutions and Networks Oy, Espoo (FI)

(72) Inventors: Mikael Mazur, Summit, NJ (US); Nicolas Fontaine, New Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 153 days.

(21) Appl. No.: 18/680,937

(22) Filed: May 31, 2024

(65) Prior Publication Data

US 2025/0044129 A1 Feb. 6, 2025

Related U.S. Application Data

(60) Provisional application No. 63/530,405, filed on Aug. 2, 2023.

(51) Int. Cl.
*G01D 5/353* (2006.01)
*G01H 9/00* (2006.01)

(52) U.S. Cl.
CPC ......... *G01D 5/35361* (2013.01); *G01H 9/004* (2013.01)

(58) Field of Classification Search
CPC . G01D 5/35361; G01D 5/35306; G01H 9/004
See application file for complete search history.

(56) References Cited

U.S. PATENT DOCUMENTS 7,885,539 B2 2/2011 Leppla et al.
2007/0018635 A1* 1/2007 Nebendahl ......... G01M 11/3109 356/73.1
2012/0067118 A1* 3/2012 Hartog .................... E21B 41/00 73/152.16
2016/0191163 A1* 6/2016 Preston ................... G01L 1/242 398/16
2017/0108358 A1* 4/2017 Bastianini .......... G01D 5/35303
2018/0073959 A1* 3/2018 Lecoeuche ......... G01D 5/35361
2020/0116556 A1* 4/2020 Cedilnik ................. G01L 1/242
2020/0209020 A1* 7/2020 Issa ........................ G01H 9/004
2020/0284622 A1* 9/2020 Rowen ................. G01K 11/324
2021/0356316 A1* 11/2021 Ip ....................... H04Q 11/0005

(Continued)

OTHER PUBLICATIONS

Zuyuan He et al "Optical Fiber Distributed Acoustic Sensors", Jun. 12, 2021 (Year: 2021).*

(Continued)

*Primary Examiner* — Sang H Nguyen
(74) *Attorney, Agent, or Firm* — Nokia Technologies Oy

(57) ABSTRACT

A method and apparatus of OFDR are disclosed, in which a pair of probe signals are launched, on mutually orthogonal channels, into the optical fiber cable that is to be monitored. In a digital processing circuit, phase noise is cancelled from the return signals after detecting them in their respective mutually orthogonal channels and after demodulating them, by combining them such that noise components of the respective demodulated signals are mutually cancelled. In embodiments, a conjugate pair of probe signals are launched, on mutually orthogonal channels, into the optical fiber cable.

16 Claims, 9 Drawing Sheets

(56) References Cited

U.S. PATENT DOCUMENTS

2021/0356776 A1* 11/2021 Ip ........................... G02F 1/125
2021/0364345 A1* 11/2021 Ip ........................... G01H 9/004
2022/0186612 A1* 6/2022 Maida, Jr. .............. G01V 1/208

OTHER PUBLICATIONS

Mazur, Mikael et al., "Advanced Distributed Submarine Cable Monitoring and Environmental Sensing Using Constant Power Probe Signals and Coherent Detection", arxiv.org, Cornell University Library, 201 Olin Library Cornell University Ithaca, NY 14853, Mar. 12, 2023, pp. 1-9.

Guerrier, Sterenn et al., "Introducing Coherent MIMO Sensing, a Fading-Resilient, Polarization-Independent Approach to (phi)-OTDR", Optics Express, vol. 28, No. 14, Jul. 6, 2020, pp. 21081-21094.

Ezra, Ip, et al., "Using Global Existing Fiber Networks for Environmental Sensing", Proceedings of the IEEE, IEEE, New York, US, vol. 110, No. 11, Nov. 1, 2022, pp. 1853-1888.

Yaxi Yan, et al., "Distributed Optical Fiber Sensing Assisted by Optical Communication Techniques", Journal of Lightwave Technology, IEEE, USA, vol. 39, No. 12, Feb. 8, 2021, pp. 3654-3670.

Z. Ding et al., "Distributed Optical Fiber Sensors Based on Optical Frequency Domain Reflectometry: A review", Sensors 2018 (18) (Apr. 3, 2018) 1072.

N.J. Lindsey et al., "Illuminating seafloor faults and ocean dynamics with dark fiber distributed acoustic sensing", Science 366 (6469) (Nov. 29, 2019) 1103-1107.

Ping Lu et al., "Distributed optical fiber sensing: Review and perspective", Appl. Phys. Rev. 6, 041302 (2019); doi: 10.1063/1.5113955.

G. Marra et al., "Ultrastable laser interferometry for earthquake detection with terrestrial and submarine cables", Science 361 (6401) (Jun. 14, 2018) 486-490.

G. Marra et al., "Optical interferometry-based array of seafloor environmental sensors using a transoceanic submarine cable", Science 376, (2022) 874-879.

M. Mazur et al., "Advanced Distributed Submarine Cable Monitoring and Environmental Sensing using Constant Power Probe Signals and Coherent Detection", Suboptic 2023, Bangkok, Thailand, Mar. 13-16, 2023, arXiv. 2303.06528.

M. Mazur et al., "Transoceanic Phase and Polarization Fiber Sensing using Real-Time Coherent Transceiver," Paper M2F.2, OFC2022, Optica Publishing Group (2022).

M. Mazur et al., "Real-Time In-Line Coherent Distributed Sensing Over a Legacy Submarine Cable," Paper Th4B.8, OFC2024, San Diego, California, Mar. 24-28, 2024.

J.P. Moore, "Basic Theory and Operating Principles of Optical Frequency Domain Reflectometry Measurement Systems as Applied to Fiber Bragg Grating Sensors", NASA/TP-20230005269 (May 2023).

O. H. Waagaard et. al., "Real-time low noise distributed acoustic sensing in 171 km low loss fiber," OSA Continuum, vol. 4 (2) (2021).

Zhongyang Xu et al, "Simultaneous Real-Time Ranging and Velocimetry via a Dual-Sideband Chirped Lidar", IEEE Photonics Technol. Lett. 29 (24) (Dec. 15, 2015).

* cited by examiner

NOISE CANCELLED OFDR TRACE
235
DSP
230
S
CONJUGATE S
COH.RX
245
FIBER UNDER TEST
205
200
240
PBS
215
220
Y-POL
X-POL
DUAL POL MODULATOR
SPLITTER
210
S
222
CONJUGATE OF S
223
LASER
225

LONG RANGE DISTRIBUTED FIBER SENSING WITH IMPROVED NOISE PERFORMANCE

CROSS REFERENCE TO RELATED APPLICATION

This application claims the benefit of Provisional Application Ser. No. 63/530,405, filed in the US Patent and Trademark Office on Aug. 2, 2023.

TECHNICAL FIELD

The disclosure relates to methods and apparatus of Distributed Acoustic Sensing (DAS) in optical fiber cables.

ART BACKGROUND

Fiber-optic cables may be useful as distributed sensors for environmental sensing, such as earthquake detection and storm-weather monitoring, as well as for gathering diagnostic information useful for optimizing communication networks.

For example, M. Mazur et al., "Advanced Distributed Submarine Cable Monitoring and Environmental Sensing using Constant Power Probe Signals and Coherent Detection", SubOptic 2023, Bangkok, Thailand, arXiv2303.06528, httpsJ/doi.org/10.48550/arXiv.2303.06528, cited hereinafter as "Mazur 2023", discusses a technique of distributed cable monitoring, using high loss loop-back (HLLB) configurations in submarine cable repeaters. The technique reported there can measure both phase and polarization of an optical signal. The entirety of Mazur 2023 is hereby incorporated herein by reference.

Known methods of distributed cable monitoring are limited in sensitivity by acoustic noise that becomes more severe as cable length increases. In submarine cables, for example, signal distortion by acoustic noise can be severe, since the total roundtrip time is longer than the timescale on which acoustics typically perturb the fiber link. Another problem encountered in submarine optical fiber cables, for example, is that expansion and contraction of the optical fiber can give rise to timing anomalies that are difficult to distinguish from frequency drift of the source lasers or sampling clocks.

There is thus a need for techniques of acoustic noise suppression that will improve the sensitivity of distributed cable-monitoring measurements.

SUMMARY

Optical Frequency-Domain Reflectometry (OFDR) is one of several known methods of distributed cable monitoring. In OFDR, the optical frequency of a continuous wave (cw) light source varies with time, typically in a linear sweep. The frequency-swept light is divided into a probe signal and a reference signal. The probe signal is injected into the monitored cable. Backscattered or reflected light from the cable is directed to a coherent detector where it is combined with the reference signal for detection.

The backscattered signal arrives at the detector as a time-delayed version of the probe signal. Because of the frequency sweep, the time delay corresponds to a frequency shift between the backscattered light and the reference signal. If there are multiple discrete reflectors along the cable, each reflector will contribute a respective time delay and corresponding frequency shift. If the backscatter is distributed along the cable, the time delay and corresponding frequency shift will likewise be distributed.

Assuming for simplicity that backscatter is from only a single reflector in the cable, interference of the backscattered and reference signals at the detector will produce a beat frequency in the photocurrent output from the detector. The Fourier transform of the detected signal may be used to obtain a value for the beat frequency, from which the distance to the backscattering event can be derived.

Distance measurements, if sufficiently precise, can be used to detect length fluctuations, such as fluctuations in the lengths of the fiber spans of a submarine cable. Other types of measurements can also be made. For example, polarization-resolved OFDR can detect polarization changes in the fiber spans. Various techniques can also be used to make optical phase measurements.

We have developed an improved OFDR technique that can use conjugated sweeps to suppress acoustic noise. As a consequence, sensitivity can be improved for distance measurements, as well as for polarization and phase measurements.

In embodiments of our technique, a frequency-swept probe signal and its complex conjugate are both injected into the cable. The two probe signals must be placed on mutually orthogonal channels. In example embodiments, they are placed on mutually orthogonal polarization channels. Other possible examples of mutually orthogonal channels include channels that are separated in time or in frequency, or separated by coding. In an example using polarization-resolved OFDR, the conjugate probe signals may be on mutually orthogonal polarization channels, which may also be separated in frequency.

The backscattered signals that return in the respective probe channels are separately detected in a coherent detector that can resolve output in different phase channels, e.g., an in-phase (I) channel and a quadrature-phase (Q) channel, and/or that can obtain both amplitude and phase information about the signal. For example, one type of detector suitable for such a purpose is an optical heterodyne detector.

The detector output signals are digitized and subjected to digital signal processing in which the measured backscatter from the two mutually conjugate complex output signals is used in a manner to reduce undesired effects of acoustic phase noise in the optical fiber line used for backscattering measurements.

In some embodiments, transfer characteristics of the measured system can be obtained by demodulating and processing the detector output signals. For example, a coordinate z of a reflective element in an optical fiber line may be determined, where z is a measure of distance or time of flight. In examples of measurement on a single-mode fiber system, it may be possible to obtain, e.g., part of the 2×2 complex Jones matrix $J(\omega,z)$, where $\omega$ is the optical frequency around the center measurement frequency. In some cases, information obtained in this way may include information regarding the fiber impulse response.

Accordingly, the disclosure relates, in one aspect, to apparatus comprising an optical transmitter, a coherent optical receiver, a demodulator circuit, and a digital processing circuit. The optical transmitter is configured to inject first and second OFDR probe signals into an optical fiber cable on respective, mutually orthogonal first and second probe channels, thereby to excite reflection events within the optical fiber cable that cause first and second reflection signals on the respective first and second probe channels to return on the optical fiber cable. The coherent optical receiver is configured to receive the first and second reflection signals from the optical fiber cable and to detect the first and second reflection signals, thereby to produce, in the electrical domain, respective first and second detector signals.

The demodulator circuit is configured to demodulate the first and second detector signals, thereby to produce respective first and second demodulated signals. The digital processing circuit is configured to extract, from the first and second demodulated signals, at least time values indicative of round-trip propagation times, for light of said first and second probe signals in the optical fiber, due to at least some of the reflection events.

The optical transmitter is further configured to inject the first OFDR probe signal with a first modulation envelope, and to inject the second OFDR probe signal with a second modulation envelope that, in embodiments, may be a complex conjugate of the first modulation envelope.

The digital processing circuit is further configured to cancel phase noise from the indicative time values by combining the first and second demodulated signals such that noise components of the respective demodulated signals are mutually cancelled.

In embodiments, the digital processing circuit is configured to estimate the indicative time value by evaluating a difference of time-dependent phases of the measured portions of the first and second probe signals.

In embodiments, the optical transmitter is configured to inject the first and second OFDR probe signals while linearly sweeping their frequencies. In embodiments, the optical transmitter is configured to sweep the respective frequencies of the first and second OFDR probe signals in opposite directions.

In embodiments, the optical transmitter is configured to inject the first and second OFDR probe signals into the optical fiber cable on respective, mutually orthogonal polarization channels. Alternatively, or in addition, the optical transmitter may be configured to inject the first and second OFDR probe signals into the optical fiber cable on respective, mutually orthogonal optical wavelength channels.

In embodiments, the optical transmitter is configured to inject the first OFDR probe signal with a first linearly swept frequency modulation envelope, and to inject the second OFDR probe signal with a second linearly swept frequency modulation envelope that is a complex conjugate of the first swept frequency modulation envelope.

The disclosure relates, in a second aspect, to a method, comprising injecting first and second OFDR probe signals into an optical fiber cable on respective, mutually orthogonal first and second probe channels. The method further comprises measuring content of the first and second probe signals that has been backscattered from the optical fiber cable, and estimating, from the measured backscattered content, a time value indicative of a round-trip propagation time for light of the first and second probe signals on each of one or more paths within the optical fiber.

In embodiments, the backscattered content is received in a coherent optical receiver.

In embodiments, the estimating is performed using a digital processing circuit.

In embodiments, the estimating of a time value comprises evaluating a difference of time-dependent phases of the measured backscattered content of, respectively, the first and second probe signals. For example, the digital processing circuit may be configured to evaluate the phase difference after removing phases that vary quadratically with time.

In embodiments, the injecting the first and second OFDR probe signals is performed while linearly sweeping frequencies of the first and second OFDR probe signals. In embodiments, the linear sweeping of frequencies comprises sweeping the respective frequencies of the first OFDR probe signal and the second OFDR probe signal in opposite directions.

In embodiments, the first and second OFDR probe signals are injected into the optical fiber cable on respective, mutually orthogonal polarization channels. In other embodiments, the first and second OFDR probe signals are injected into the optical fiber cable on respective, mutually orthogonal optical wavelength channels.

In embodiments, the first OFDR probe signal is injected into the optical fiber cable with a first linearly swept frequency modulation envelope, and the second OFDR probe signal is injected into the optical fiber cable with a second linearly swept frequency modulation envelope that is a complex conjugate of the first swept frequency modulation envelope.

BRIEF DESCRIPTION OF THE DRAWINGS

FIG. 10 is a composite graph, in which the accumulated frequency noise in each of more than twenty separate fiber spans has been individually plotted.

DETAILED DESCRIPTION

Figure 1:
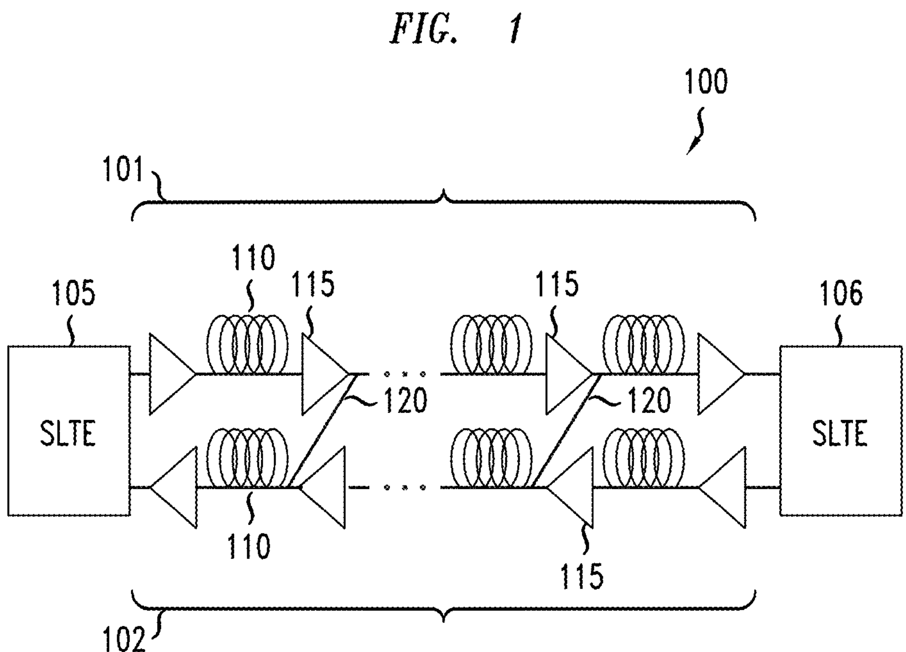
FIG. 1 is a simplified schematic diagram of an example submarine cable, optical fiber communication system. The illustrated system uses loop-back connections for monitoring optical backscattering in the optical fiber line(s).

FIG. 1 is a simplified schematic diagram of an example optical fiber transmission system for an optical fiber line or cable 100, e.g., an optical submarine cable. As shown in the figure for an example optical submarine cable, each end of cable 100 is terminated with a submarine line terminal equipment (SLTE) 105, 106. The cable 100 shown in the drawing has at least an optical fiber path 101 extending from SLTE 105 toward SLTE 106, and another optical fiber path 102 extending in the opposite direction, i.e., from SLTE 106 toward SLTE 105. For convenience only, we refer to fiber path 101 as the "outgoing" path, and to fiber path 102 as the "return" path.

As further shown in FIG. 1, cable 100 may have multiple optical fiber spans 110 that extend between repeaters. The length of such spans in a transoceanic optical cable may be between about 80 kilometers (km) and 100 km or more. At each repeater, optical amplifiers 115 amplify the optical signals entering the next span. For that purpose, erbium-doped fiber amplifiers (EDFAs) are often used.

Various adaptations may be used to facilitate monitoring and/or to diagnose problems of the optical fiber transmission system. The example illustrated in FIG. 1 uses a high-loss loop-back (HLLB) connection 120 in each repeater for monitoring.

Figure 2:
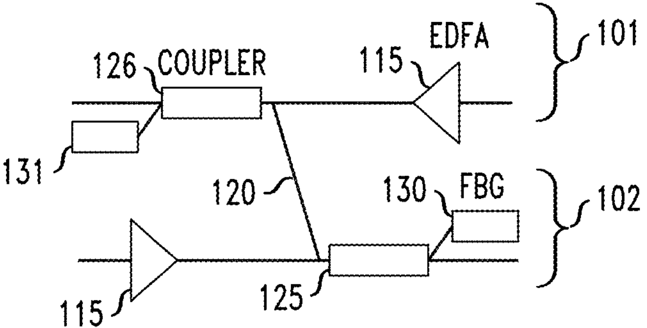
FIG. 2 is a detail of FIG. 1, showing, in simplified schematic fashion, a pair of high loss loop-back couplers such as are present in some optical repeaters of some embodiments.

FIG. 2 shows the HLLB connection 120 of FIG. 1 schematically. For illustrative purposes, but without limitation, the optical amplifiers 115 shown in FIG. 2 are explicitly labeled as EDFAs. As shown in FIG. 2, a portion of the optical signal propagating on return optical fiber path 102, after amplification, passes through coupler 125 and may then be backscattered by reflector 130 in the return optical fiber path. Coupler 125 then injects the backscattered light into outgoing optical path 101. Conversely, a portion of the optical signal propagating on outgoing optical fiber path 101 passes through coupler 126 after amplification, and may then be backscattered by reflector 131 in the outgoing optical fiber path. Coupler 126 then injects the backscattered light into return optical fiber path 102. Several suitable technologies are known in the art for implementing the reflectors 130, 131. A typical implementation, particularly for submarine cables, uses fiber Bragg gratings (FBGs).

Figure 3:
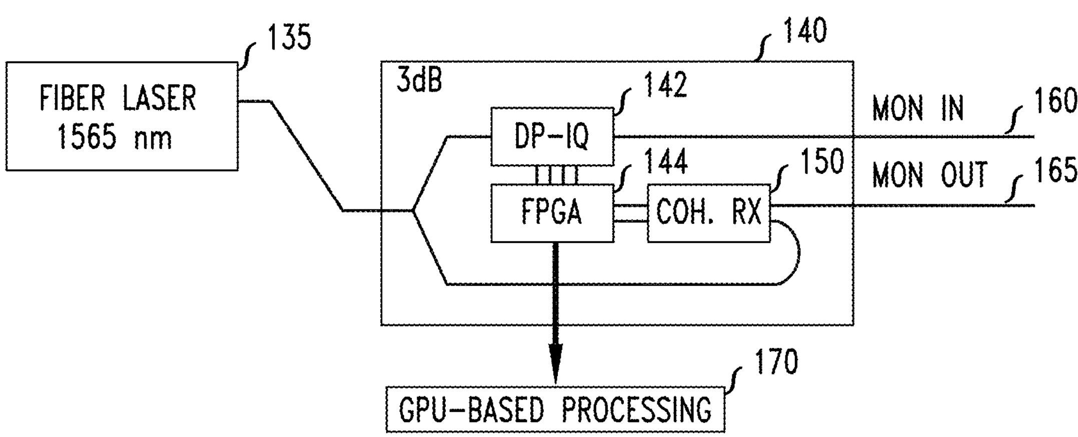
FIG. 3 is a simplified block diagram of an example of an OFDR sensing system of a kind described here.

FIG. 3 is a simplified block diagram of an OFDR sensing system in an example embodiment. As explained below, the system of FIG. 3 includes a coherent continuous power dual-polarization sensing system.

The sensing system of FIG. 3 includes a laser source 135, a detector stage 140, and a digital processing stage 170. An example laser source suitable for at least some applications is a fiber laser that is locked to a filter for active stabilization. The nominal bandwidth is preferably less than 100 Hz. An example center wavelength for the laser source is 1565 nm, although other wavelengths may be preferred for specific applications. A laser with stabilization using an external cavity may be used instead. Cavity stabilization may be advantageous for at least some applications, because it has the potential to reduce frequency noise by a significant amount, and thus to increase sensitivity.

Detector stage 140 performs coherent signal modulation and detection. In the example embodiment shown in FIG. 3, detector stage 140 includes dual-polarization IQ-modulator 142, which may be configured to generate a continuous power dual-polarization probe signal in response to electrical driving signals. Driving signals for modulator 142 are digitally generated using, e.g., FPGA 144 or another circuit structure.

In an illustrative example, FPGA 144 may use, for example, 14-bit digital-to-analog converters (DACs) operating at a clock frequency of 125 MHz to generate a set of four electrical driving signals, each having a rate of six giga-samples per second (i.e., 6 GS/s). The set of driving signals consists of an I-channel signal and a Q-channel signal for each of two orthogonal polarizations. The four electrical driving signals are phase-locked to enable stable single-sideband modulation.

As explained above, the optical frequency of an OFDR probe signal is swept, i.e., it is varied with time. By way of illustration, a linear sweep may be used, although other sweep configurations may also be useful in this regard, and are not excluded. In one non-limiting example, a linear sweep may have a bandwidth of 125 MHz and may be centered at an intermediate frequency of 500 MHz. The sweep may be repeated without dead time in a train of time windows, each of which may be equal in length to the time duration of a single sweep. The time duration is equal to the round-trip transit time for optical propagation to the most distant reflective element of interest in the cable. By way of illustration, we have employed sweeps with a duration of about 100 ms, although this figure is application-dependent and not to be understood as limiting.

The modulated optical output from dual-polarization IQ-modulator 142 is amplified and filtered before being fed into cable monitoring input port 160. The elements for amplification and filtering of the modulated optical output are not explicitly shown in FIG. 3.

Detector stage 140 further includes optical receiver 150. In a non-limiting example, receiver 150 is a polarization-diverse heterodyne optical receiver. Receiver 150 performs coherent detection of the reflected probe signal that is incoming from monitoring output port 165. Receiver 150 uses transmitter laser 135 as local optical oscillator. A complex optical signal in each of the two orthogonal polarization channels is received as output from monitoring output port 165. By way of illustration, the two output signals may be sampled at 2 GS/s using 14-bit analog-to-digital converters.

Digital processing stage 170 may be implemented, for example, in a digital signal processor (DSP). For at least some applications, a GPU-based real-time processing unit may be useful for this purpose. Illustratively, but not for limitation, processor 170 is expressly labeled in FIG. 3 as a GPU-based processor. Processor 170 digitally demodulates the two received optical signals. An illustrative measurement bandwidth is 300 kHz. The demodulation is performed, e.g., to extract phase and Jones matrix information from the reflected signal backscattered at one or more of the repeaters along the cable.

With digital demodulation, it may be possible to continuously monitor, in parallel, all repeaters along the cable. It could also be possible to monitor intermediate positions along the cable through detection of Rayleigh backscattering, for example.

It is advantageous to use constant-power probe signals, because at least some signal degradation by nonlinear effects can thereby be avoided. Coherent detection is advantageous, not least because it enables filtering and processing to be performed by digital signal processing, which is beneficial for received signal quality.

We found that phase measurements and Jones matrix measurements of the reflected signals can be made significantly more sensitive under realistic conditions by using conjugated sweeps. In trials, we separated the two polarization channels of the probe signal by frequency so that their reflections could be separated for detection. It should be understood in this regard that in general, the respective mutually conjugate probe signals may be placed on channels that are mutually orthogonal in the polarization dimension, the frequency dimension, or in other dimensions such as the time dimension or the code dimension.

We will now describe, in simple terms, an example of a polarization-resolved measurement using conjugated sweeps. We launch a probe waveform X(t) in one of two mutually orthogonal polarization channels, and we launch a probe waveform Y(t) in the other polarization channel. X(t)

and Y(t) are complex conjugates, i.e., X(t)=Y*(t). As explained below, joint processing of the reflections of X(t) and Y(t) can separate distortions from the fiber from system noise, and can enable acoustic cancellation.

More specifically, system perturbations due to laser frequency drift, clock drift, and the like can degrade the measurement of, e.g., the distance to a point $\hat{z}$ on the fiber path. The measurement using probe X(t) might yield, e.g., $z_X=\hat{z}+\Delta$. Weak distortions in the type of measurement system discussed here may often be assumed to be linear, to a good approximation. For linear distortions, the corresponding measurement using probe Y(t) would yield $z_Y=\hat{z}-\Delta$. Thus, combining these measurements can cancel the distorting effects to first order, yielding a more accurate measurement of $\hat{z}$. Similar benefits can be realized when conjugated signals are used to measure phase or polarization changes along the fiber path.

Figure 4:
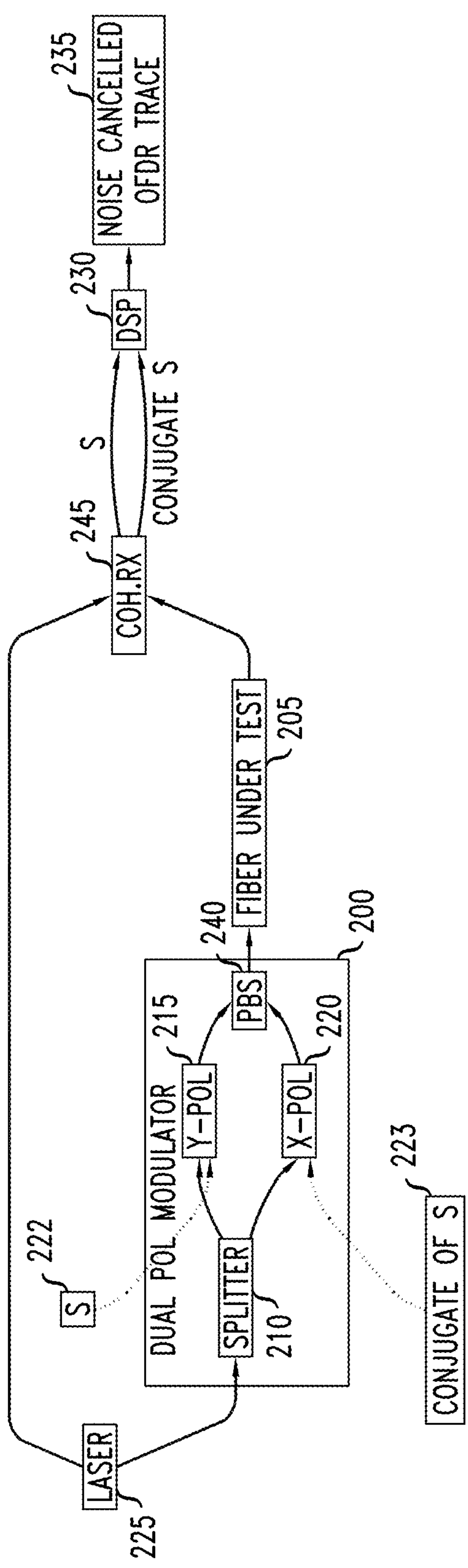
FIG. 4 is a simplified schematic diagram illustrating optical signal modulation and detection in an example system of a kind described here.

FIG. 4 is a simplified schematic diagram illustrating signal modulation and detection in an example system that uses a dual polarization I/Q modulator 200 which, in a specific example, may be a dual-nested Mach-Zehnder modulator. For simplicity of presentation, various elements present in FIG. 3 are omitted from FIG. 4, the optical fiber cable discussed above is replaced with a Fiber Under Test (FUT) 205, and the detector and digital processing stages are placed at the opposite end of FUT 205.

The modulation signal S(t) and its conjugate S*(t) (labeled "conjugate of S" in the figure) are, respectively, the driving signals for the probe signals in the mutually orthogonal Y-polarization and X-polarization channels, i.e., the optical probe and conjugate of the optical probe for the FUT 205. It should be understood that the designations X-polarization and Y-polarization are arbitrary and used only for convenience. Optionally, the X-polarization and Y-polarization channels may be offset slightly in wavelength, so that light backscattered due to the Y polarization optical probe and the X polarization conjugate optical probe can be separately detected at the optical detector/receiver.

As shown in the figure, modulator 200 includes an optical beam splitter 210 and modulator elements 215, 220 for the Y-polarization and X-polarization channels, respectively. Each of modulator elements 215, 220 is an I/Q modulator driven by I-channel and Q-channel signals from respective S(t) and S*(t) modulation signal generators 222, 223. Splitter 210 divides light from laser light source 225 into modulator elements 215, 220. Modulator 200 further includes polarization beam splitter (PBS) 240, which combines the modulated outputs from modulator elements 215, 220 for injection into FUT 205. At the monitor output end of FUT 205, coherent receiver 245 detects backscattered light from the S(t) and S*(t) monitor/probe output signals using a reference signal from laser light source 225, which is serving as local oscillator. The detected electrical domain signals due to S(t) and S*(t), respectively, are processed in DSP 230 to provide a noise-cancelled OFDR trace 235.

The waveforms of modulation signals S(t) and S*(t) are the envelopes of the modulated optical output from modulator 200.

In the example described below, the driving signal S(t) is a linearly swept signal with a frequency sweep rate of γ, and with the time dependence $S(t)=S_0e^{j\pi\gamma t^2}$. In this example, the conjugate signal S*(t) is similar to S(t), but the direction of the frequency sweep is reversed i.e., $S^*(t)=S_0e^{-j\pi\gamma t^2}$.

Alternative driving signals, other than the linear sweep, may include triangle waves and long QPSK sequences. Other alternatives may also be possible, provided that the cross-correlation of any such driving signal with itself resembles a delta function.

We will now describe an example procedure for reducing or cancelling phase noise from the measurement of the position of a reflective element, i.e., a scatterer in the FUT. The distance of the scatterer along the FUT is determined from the round-trip propagation time or delay "τ" for a probe signal backscattered by the scatterer. For simplicity, we will omit the explicit representation of the optical carrier wave $E_0e^{j\omega t}$ that is modulated by the driving signals. To further simplify the presentation, but without relinquishing generality, we will assume in the following discussion that the probe signals are reflected or backscattered from discrete scatterers, e.g., reflectors 131 of FIG. 2 in FUT 205. As those skilled in the art will understand, the technique described here can be generalized to the case of distributed reflectors for backscatterers) for example by iteratively taking solutions treating incremental portions of the fiber path, or any combination thereof, as closely spaced individual reflectors.

Each reflective element or scatterer in FUT 205 of FIG. 2 produces backscattered waveforms, at the optical detector/receiver, of the forms: A(t)=k×S(t−τ)×N and B(t)=k×S*(t−τ)×N in response to S(t) and S*(t), respectively, being transmitted to the FUT. Here, τ is the round-trip propagation delay in the FUT 205 for propagating to an optical probe signal to a scatterer and for a backscattered part of the optical probe signal propagating back to the optical detector/receiver. The coefficient k is a scattering amplitude, at the scatterer.

For each scatterer "i", with i=1, 2, . . . , there will typically be a respective scatter amplitude $k_i$, which is real and positive. Herein, the scattering amplitude $k_i$ of scatterer "i" may alternatively be indexed by "τ", i.e., the round-trip delay for propagation of the probe light to scatterer "i" and for the return propagation time of light backscattered by the scatterer "i" to the optical detector/receiver. Accordingly, the scattering amplitude is represented as a function k(τ) in the discussion below.

The coefficient N is the accumulated acoustic phase noise, expressible as $e^{j\varphi(t,\tau)}$, where φ(t,τ) is a time-dependent phase. The accumulated acoustic phase noise will have a respective value $N_i$ near the scatterer "i", and likewise, the acoustic noise will have a respective phase value $\varphi_i(t)$ near the scatterer "i". Rather than being indexed by the identity "i" of the corresponding scatterer, the accumulated phase noise and phase value can be indexed by τ, i.e., by the round-trip delay to probe light caused by backscattering at the corresponding scatterer "i". Accordingly, the time-dependent phase is represented as a function φ(t,τ) above and in the discussion below.

Backscattering of a linearly swept optical probe signal S(t) at the scatterer will cause the signal $A(t)=k(\tau)\times S_0e^{j\pi\gamma(t-\tau)^2}\times e^{j\varphi(t,\tau)}$ to be received at the optical receiver. Likewise, backscattering of linearly swept conjugate optical probe signal S*(t) at the scatterer will cause the signal $B(t)=k(\tau)\times S_0e^{-j\pi\gamma(t-\tau)^2}\times e^{j\varphi(t,\tau)}$ to be received at the optical receiver.

In the optical detector/receiver, digital filtering recovers intermediate frequency components of A(t) and B(t) by forming $A_d(t,\tau)$, which is the product $e^{-j\pi\gamma t^2}$ A(t), and by forming $B_d(t,\tau)$, which is the product $e^{+j\pi\gamma t^2}$ B(t). Thus, $$A_d(t,\tau)=k(\tau)\times S_0\times e^{-j2\pi\gamma t\tau}\times\exp\left[-j\pi\tau^2\right]\times e^{j\varphi(t,\tau)},\text{ and}$$

-continued $$B_d(t,\tau)=k(\tau)\times S_0\times e^{+j2\pi\gamma t\tau}\times \exp[+j\pi\tau^2]\times e^{j\varphi(t,\tau)}.$$

In the optical detector/receiver, digital processing may further include determining "τ", to evaluate the location of the scatterer along the FUT 205 based on the measurements of both $A_d(t,\tau)$ and $B_d(t,\tau)$. In particular, the time-dependent part of the phase of $A_d(t,\tau)$ is $-2\pi\gamma t\tau+\varphi(t,\tau)$. This phase may be used to evaluate "τ". However, such an evaluation is subject to errors due to the acoustic phase noise contribution, i.e., $\varphi(t,\tau)$. Herein, in various embodiments, the optical detector/receiver performs digital processing to obtain the time-dependent part of the difference of the phases of the backscattered optical probe signal and the backscattered conjugate of the optical probe signal, i.e., $-4\pi\gamma t\tau$. In evaluating this difference to obtain τ, the acoustic phase contribution is cancelled so that the optical detector/receiver of various embodiments obtains a better estimate of τ and thus, a better estimate of the position of the scatterer along FUT 205.

The conjugate could be launched at a slightly different frequency, an opposite polarization, or at a slightly different time. The DSP/demodulation needs to be able to separate backscattered light from the probe signal and backscattered light from the conjugate of the probe signal. If they are separated in frequency, the separate recovery can be done with filtering; if they are separated in time, the separate recovery can be done temporally. In the figure above, S(t) is launched on one of two mutually orthogonal polarizations, and its complex conjugate S*(t) is launched on the other polarization.

If there air a plurality of discrete reflective elements, the spectrum obtained from the Fourier transform of $A_d(t,\tau)$ will exhibit peaks at frequencies $\Omega_i=\tau_i\gamma$, corresponding to the respective reflector locations.

The spectrum can be filtered in the frequency domain (or equivalently, the delay domain) and the respective phases of the $A_d$ and $B_d$ signals can be extracted by known methods.

Bandpass filtering can be applied to isolate a segment of each frequency spectrum that corresponds to a single selected reflector, referred to here as reflector i. By known techniques, a Fourier transform can be applied to the isolated segments to recreate respective time-domain signals $A_{di}(t,\tau_i)$ and $B_{di}(t,\tau_i)$.

The phase $\Phi(A_{di})$ of time-domain signal $A_{di}(t,\tau_i)$ is given by $\Phi(A_{di})=2\pi\gamma\tau_i t+\varphi(t,\tau_i)$. The phase $\Phi(B_{di})$ of time-domain signal $B_{di}(\tau,\tau_i)$ is given by $\Phi(B_{di})=-2\pi\gamma\tau_i t+\varphi(t,\tau_i)$. Subtracting these quantities yields $\Phi(A_{di})-\Phi(B_{di})=4\pi\gamma\tau_i$, which provides a value for the delay $\tau_I$ of the i'th reflective element from which the phase-noise component has been cancelled. The spatial location of the reflective element is readily derived from the calculated value of $\tau_I$.

It should also be understood that by taking the sum $\Phi(A_{di})+\Phi(B_{di})$, a value can be obtained for the phase noise, which is also important for characterizing the optical cable system.

Figure 5:
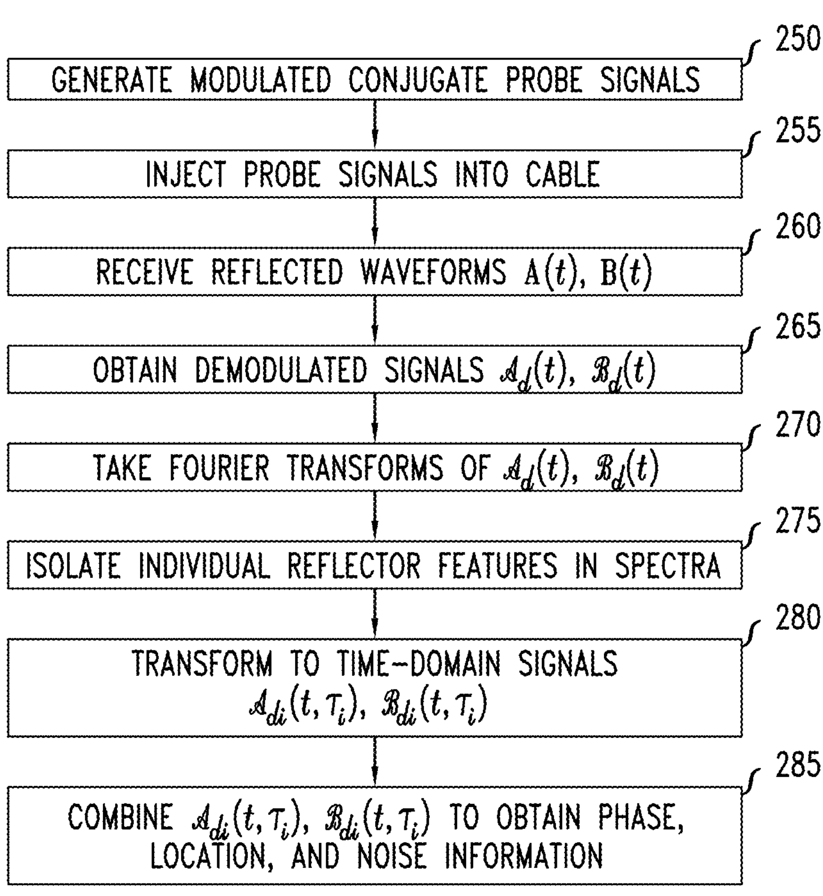
FIG. 5 is a flowchart of an example procedure for measuring optical fiber properties, using a probe signal and a conjugate of the probe signal to facilitate noise cancellation.

FIG. 5 is a flowchart of an example procedure for measuring optical fiber properties, using conjugated probe signals to facilitate noise cancellation. It should be understood that FIG. 5 is meant only as a pedagogical aid, and that it should not be understood as limiting the practice of the procedure to any particular choice of the various signal-processing techniques by which the underlying concepts of the procedure can be implemented.

Turning to FIG. 5, the optical carrier is modulated at block 250 by mutually conjugate driving signals to produce the probe signals, which are injected into the cable at block 255. Waveforms A(t) and B(t) that have been reflected from a reflector element in the cable are received at block 260. The reflected waveforms are demodulated at block 265 to obtain the demodulated signals $A_d(t)$ and $B_d(t)$. At block 270. Fourier transforms of $A_d(t)$ and $B_d(t)$ are performed. At block 275, features of the Fourier transforms indicative of individual reflector elements are identified, and the pertinent segments of the frequency spectra are isolated. At block 280, the respective time-domain signals $A_{di}(t,\tau_i)$ and $B_{di}(t,\tau_i)$ are obtained by taking inverse Fourier transforms of the isolated spectral segments. At block 285, phases and spatial locations are derived, with noise cancellation, by combining the signals $A_{di}(t,\tau_i)$ and $B_{di}(t,\tau_i)$, and a phase-noise measurement is also derived by combining the two signals.

Example 1

A prototype OFDR system of the kind described here was tested by connecting it to the input/output monitoring ports of a transatlantic fiber-optic cable between North America and Europe. The transatlantic fiber cable uses pairs of single-mode fiber for bi-directional transmission. The cable includes about eighty repeaters for signal amplification. A high-loss loopback configuration is included in each repeater, which allows backscattered light from the forward transmission span to be coupled into the fiber transmitting in the opposite direction.

Although in the present example the probe signals are launched into a forward fiber and the backscattered signal is returned in a separate return fiber, it should be understood that in alternative embodiments, the backscattered signal can be returned in the same fiber that supported the forward transmission of the probe signals.

We used the prototype OFDR system to make measurements that show movement of the respective fiber spans of the cable. The measurements were made by monitoring the reflected signal from each repeater, with application of noise-cancelling techniques as described above.

Figure 6:
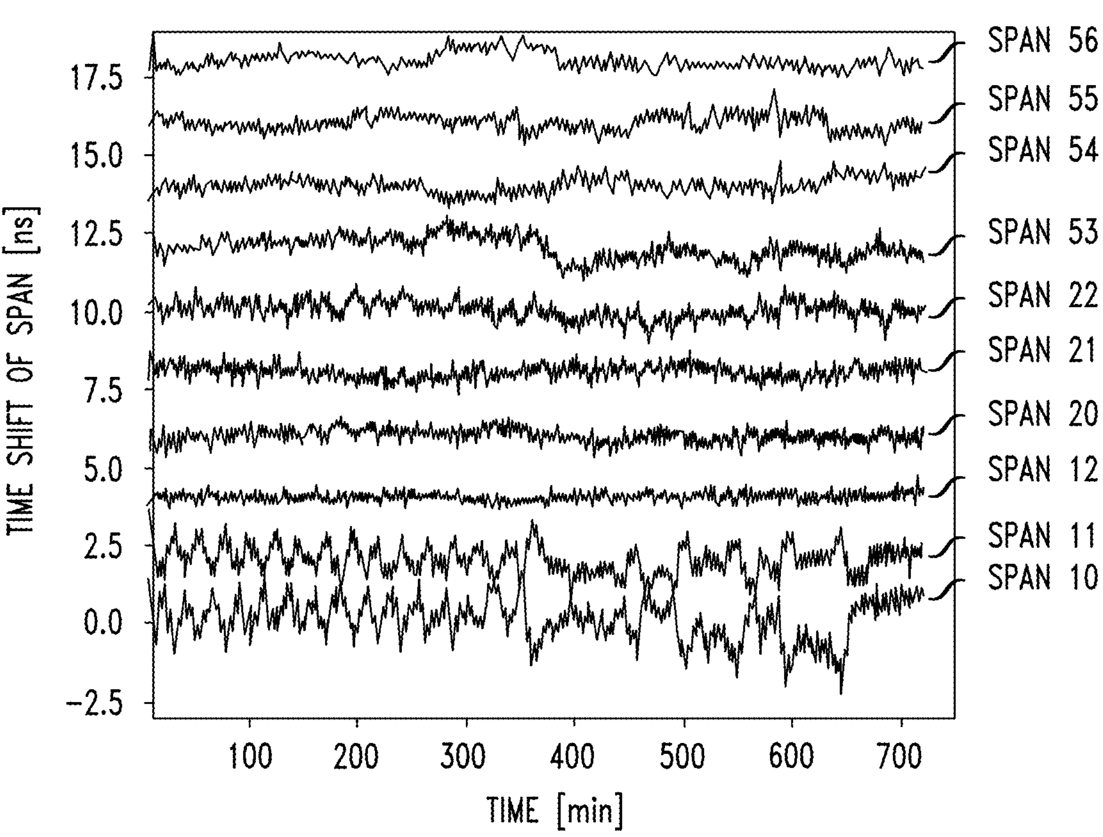
FIG. 6 is a graph of experimentally measured data for each of ten selected spans of a transatlantic fiber-optic cable.

FIG. 6 is a graph of experimentally measured data for each often selected spans of the cable. From the bottom of the graph to the top, the represented spans are spans 10, 11, 12, 20, 21, 22, 53, 54, 55, and 56. For each span, we have plotted a time shift, i.e., a relative change in propagation time from the corresponding reflector, in nanoseconds (ns). The respective time shifts are plotted as functions of measurement time, in minutes (min). All reflectors were measured continuously in parallel.

Among other features of FIG. 6, it is of interest that the time shifts of spans 10 and 11 appear to move in opposite directions, implying stretching and contraction of the affected liber segment. It is also of interest that spans 20-22 exhibit little movement. This is consistent with the observation that these spans map to a point of the geoprofile where the fiber is expected to lie flat on the sea bottom. By contrast, spans 53-56, which map approximately to the mid-Atlantic ridge, exhibit greater movement. That portion of the cable overlies rockier terrain, and would therefore be expected to be more susceptible to perturbative forces.

Example 2

Figure 7:
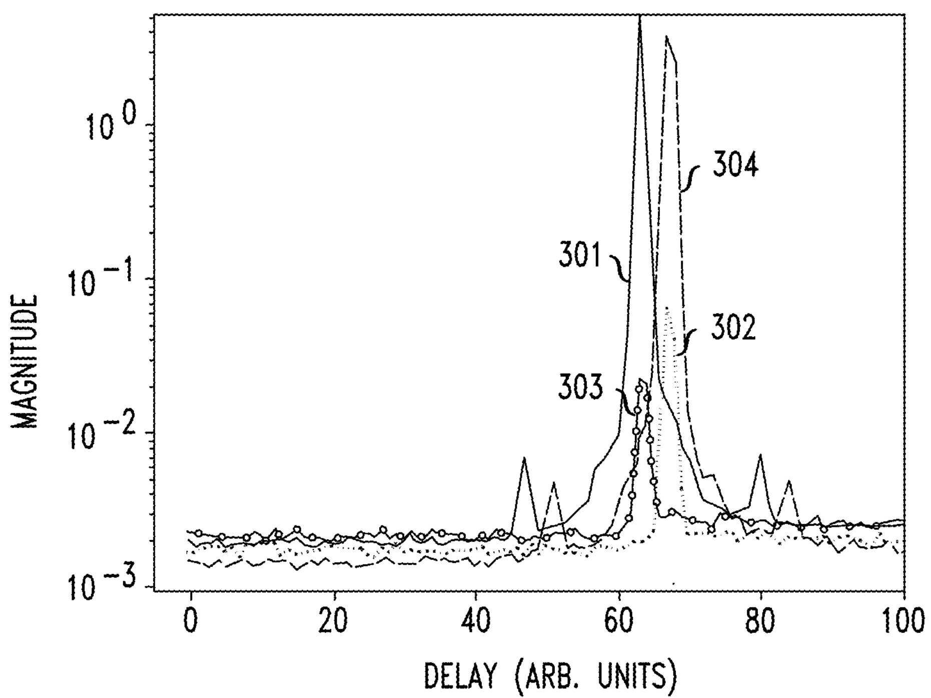
FIG. 7 is an example of part of a Jones matrix that we measured using pairs of probe signals, related by conjugation, in a transatlantic fiber-optic cable.

FIG. 7 is an example of features of a Jones matrix that we measured using conjugated signals in the transatlantic cable of Example 1 over a range of distances near a position z identified as corresponding to a particular repeater. Four curves are shown in FIG. 7. Each of these curves represents the magnitude of one of the four respective components of a Jones matrix. The horizontal axis in FIG. 7 represents delay or distance, in arbitrary units.

Curve 301 is the XX measurement, curve 3022 is the XY measurement, curve 303 is the YX measurement, and curve 304 is the YY measurement. The best measurement of z is obtained by averaging the results from the several curves. Without the conjugated sweeps, by contrast, the four curves would all be superimposed, leading to an estimation error.

Example 3

A sensing system substantially as described above was used to perform coherent optical frequency-domain reflectometry (C-OFDR) in a submarine telecommunications cable approximately 2000 km in length and containing about 25 submerged repeaters equipped with high-loss loop-backs with a loss of about 36 dB. No fiber Bragg gratings were included in the cable repeaters.

Chirped pulses with a duration of about 100 ms were generated via parallel processing on an FPGA, up-sampled to 6 GS/s, and connected to a custom-designed silicon photonics analog coherent optical module. A NKT E15 fiber laser with a linewidth of less than 100 Hz was used as both transmitter laser and local oscillator. The receiver outputs were digitized using corresponding 14-bit analog-to-digital converters running at 4 GS/s. The real-time data stream were filtered, decimated and streamed via a 100-GBit/s Ethernet interface to a graphics processing unit (GPU), which performed real-time processing using standard OFDR-based techniques.

The OFDR sweep spanned approximately 30 MHz. The sweep was repeated every 67 ms.

Figure 8:
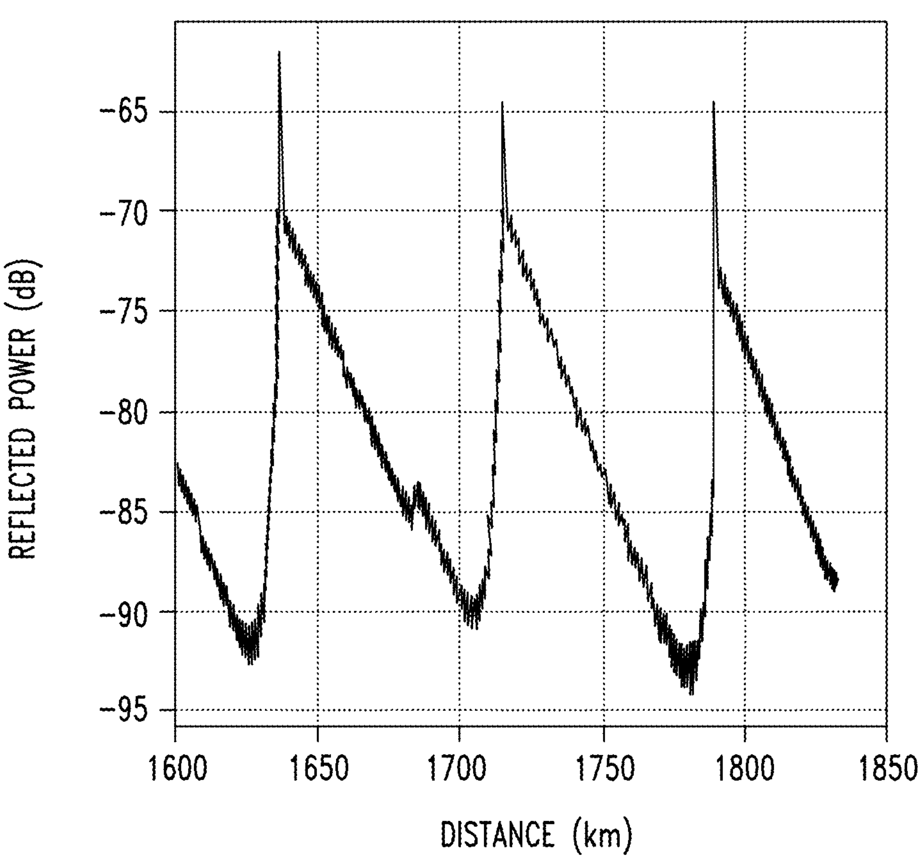
FIG. 8 is a portion of an OFDR trace measured in an experimental trial. In the figure, reflected optical power is plotted versus distance along the cable. Reflections from the last three spans of a fiber-optic cable are visible in the figure.

FIG. 8 is a portion of measured OFDR trace, in which reflected optical power is plotted versus distance along the cable. Reflections from the last three spans of the cable are visible in the figure. The data shown in FIG. 8 were corrected with digital phase-noise compensation, and were taken with an averaging time of 60 seconds.

Figure 9:
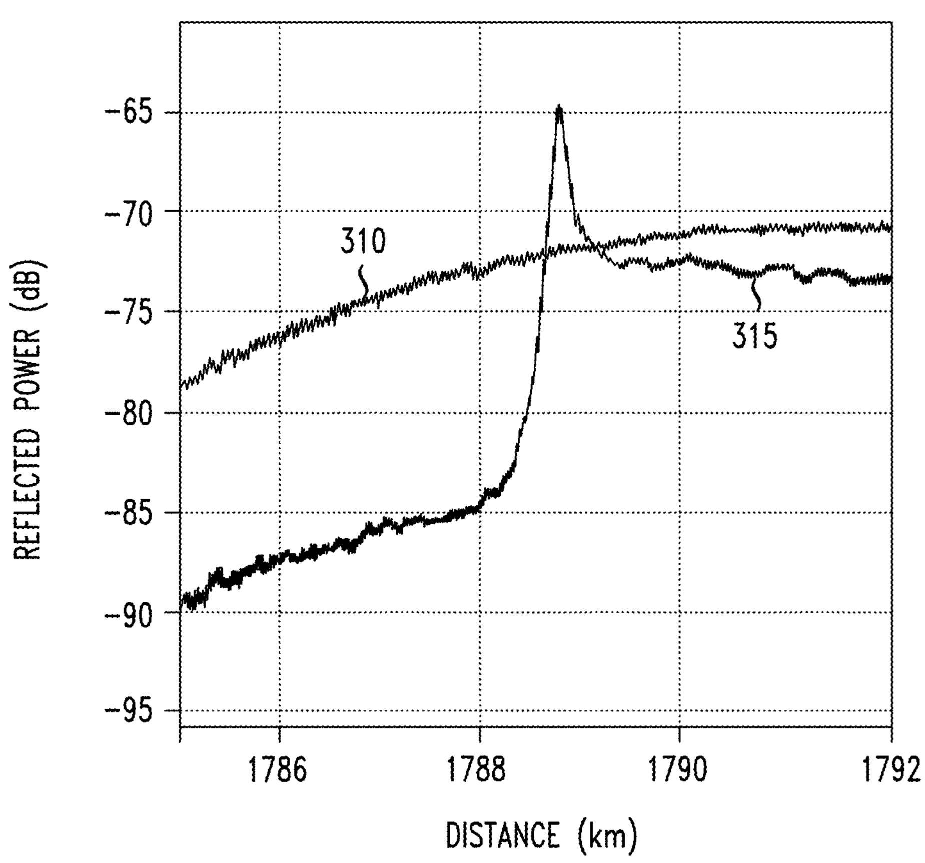
FIG. 9 shows a magnified view of two OFDR traces from the experimental trial of FIG. 8. One of the traces shown is from uncorrected data, and the other trace is from phase-corrected data.

FIG. 9 shows a magnified view of OFDR traces 310, 315 from the last cable span. Trace 310 is from uncorrected data, and trace 315 is from phase-corrected data. Our measurements showed that phase correction improved the spatial resolution from kilometer scale to about 200 m.

Figure 10:
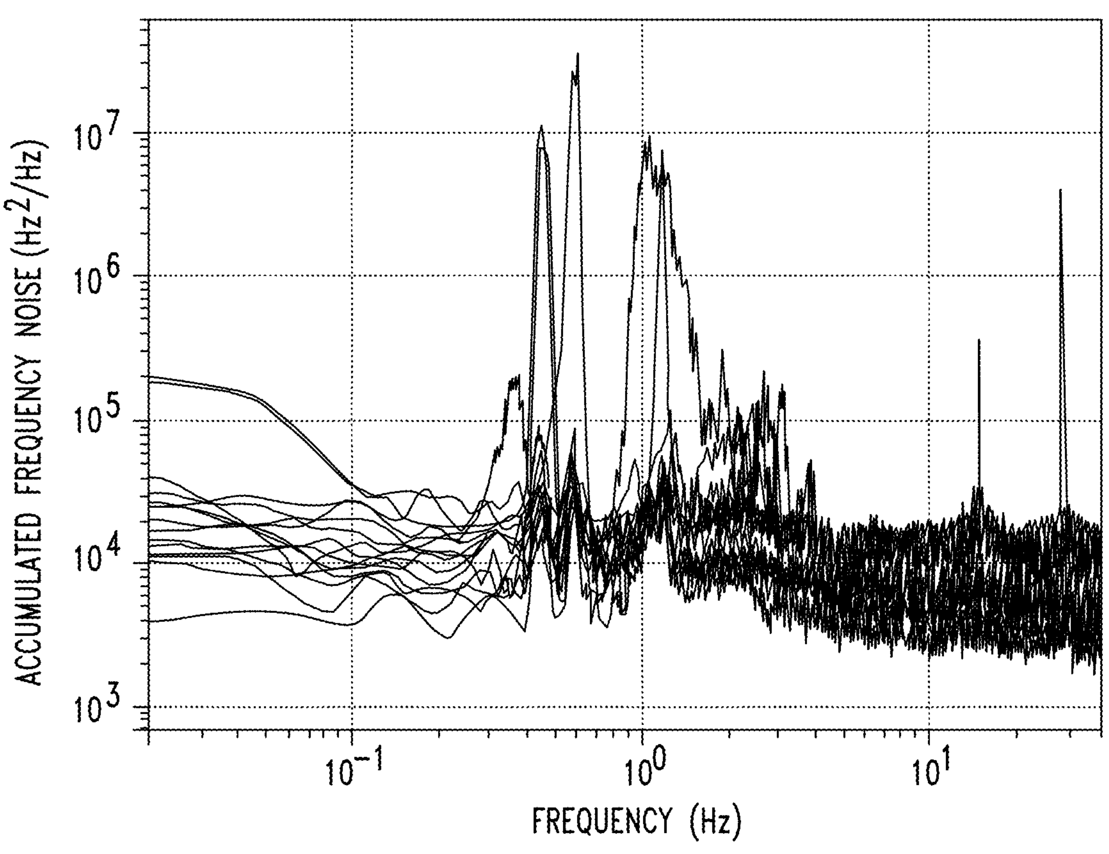
FIG. 10 is a spectrum from the experimental trial of FIGS. 8 and 9, in which the measured spectral density of frequency noise is plotted versus frequency.

FIG. 10 is a spectrum in which the measured spectral density of frequency noise is plotted versus frequency. The frequency noise is computed as a phase difference between spans. FIG. 10 is a composite graph, in which the accumulated frequency noise in each of more than twenty spans has been individually plotted. It can be seen in the figure that some cable segments are very quiet, whereas other segments exhibit resonances, for example in the range of 0.5-5 Hz.

We claim:

1. An apparatus comprising:

an optical transmitter configured to inject first and second optical frequency domain reflectometry (OFDR) probe signals into an optical fiber cable on respective, mutually orthogonal first and second probe channels, wherein the optical transmitter is configured to inject the first OFDR probe signal with a first linearly swept frequency modulation envelope, and to inject the second OFDR probe signal with a second linearly swept frequency modulation envelope that is a complex conjugate of the first swept frequency modulation envelope;

a coherent optical receiver configured to measure portions of the first and second OFDR probe signals received in response to backscattering of the first and second OFDR probe signals at a scatterer in the optical fiber cable; and a digital processing circuit configured to estimate, from the measured portions of the first and second OFDR probe signals, a time value indicative of a round-trip propagation time for light of said first and second OFDR probe signals in the optical fiber cable.

2. The apparatus of claim 1, wherein the digital processing circuit is configured to estimate the indicative time value by evaluating a difference of time-dependent phases of the measured portions of the first and second OFDR probe signals.

3. The apparatus of claim 2, wherein the optical transmitter is configured to inject the first and second OFDR probe signals while linearly sweeping frequencies of said first and second OFDR probe signals.

4. The apparatus of claim 3, wherein the optical transmitter is configured to sweep the respective frequencies of the first and second OFDR probe signals in opposite directions.

5. The apparatus of claim 2, wherein:

the digital processing circuit is configured to evaluate said phase difference from the measured portions of the first and second OFDR probe signals after removing phases that vary quadratically with time; and the optical transmitter is configured to inject the first and second OFDR probe signals while linearly sweeping frequencies of said first and second OFDR probe signals.

6. The apparatus of claim 5, wherein the optical transmitter is configured to sweep the respective frequencies of the first and second OFDR probe signals in opposite directions.

7. The apparatus of claim 1, wherein the optical transmitter is configured to inject the first and second OFDR probe signals into the optical fiber cable on respective, mutually orthogonal polarization channels.

8. The apparatus of claim 1, wherein the optical transmitter is configured to inject the first and second OFDR probe signals into the optical fiber cable on respective, mutually orthogonal optical wavelength channels.

9. A method, comprising:

injecting first and second optical frequency-domain reflectometry (OFDR) probe signals into an optical fiber cable on respective, mutually orthogonal first and second probe channels, wherein the first OFDR probe signal is injected into the optical fiber cable with a first linearly swept frequency modulation envelope, and the second OFDR probe signal is injected into the optical fiber cable with a second linearly swept frequency modulation envelope that is a complex conjugate of the first swept frequency modulation envelope;

measuring content of the first and second OFDR probe signals that has been backscattered from the optical fiber cable; and estimating, from the measured backscattered content, a time value indicative of a round-trip propagation time for light of said first and second OFDR probe signals on each of one or more paths within the optical fiber cable.

10. The method of claim 9, wherein the backscattered content is received in a coherent optical receiver.

11. The method of claim 9, wherein the estimating is performed using a digital processing circuit.

12. The method of claim 9, wherein the estimating of a time value comprises evaluating a difference of time-dependent phases of the measured backscattered content of, respectively, the first and second OFDR probe signals.

13. The method of claim 12, wherein the injecting the first and second OFDR probe signals is performed while linearly sweeping frequencies of the said first and second OFDR probe signals.

14. The method of claim 13, wherein the linear sweeping of frequencies comprises sweeping the respective frequencies of the first OFDR probe signal and the second OFDR probe signal in opposite directions.

15. The method of claim 9, wherein the first and second OFDR probe signals are injected into the optical fiber cable on respective, mutually orthogonal polarization channels.

16. The method of claim 9, wherein the first and second OFDR probe signals are injected into the optical fiber cable on respective, mutually orthogonal optical wavelength channels.

* * * * *